Oct. 18, 1932.                J. S. BUCKWALTER                1,883,529
                                  NUTCRACKER
                             Filed Nov. 28, 1928

INVENTOR.
Jacob S. Buckwalter,
BY
ATTORNEY.

Patented Oct. 18, 1932

1,883,529

UNITED STATES PATENT OFFICE

JACOB S. BUCKWALTER, OF PHILADELPHIA, PENNSYLVANIA, ASSIGNOR TO JACOB R. HERSHEY, OF KINZERS, PENNSYLVANIA

NUTCRACKER

Application filed November 28, 1928. Serial No. 322,506.

The present invention relates to "nut crackers" and consists in the combinations and arrangements of elements hereinafter described and particularly set forth in the accompanying claims.

The invention has for its purpose to provide a "nut cracker" adapted for breaking nuts of the hard shell type, e. g. hickory nuts and black walnuts or the like, wherein the nut shell is effectively cracked in an easy and convenient manner leaving the kernel or meat portions substantially intact, and in a way which prevents "flying" or scattering of the shell fragments.

A further purpose of the invention is to provide a device of this character which is of simple mechanical construction, employing but few parts not liable to get out of order, one which will not require any special skill to use, and which may be manufactured at small cost.

Figure 1:
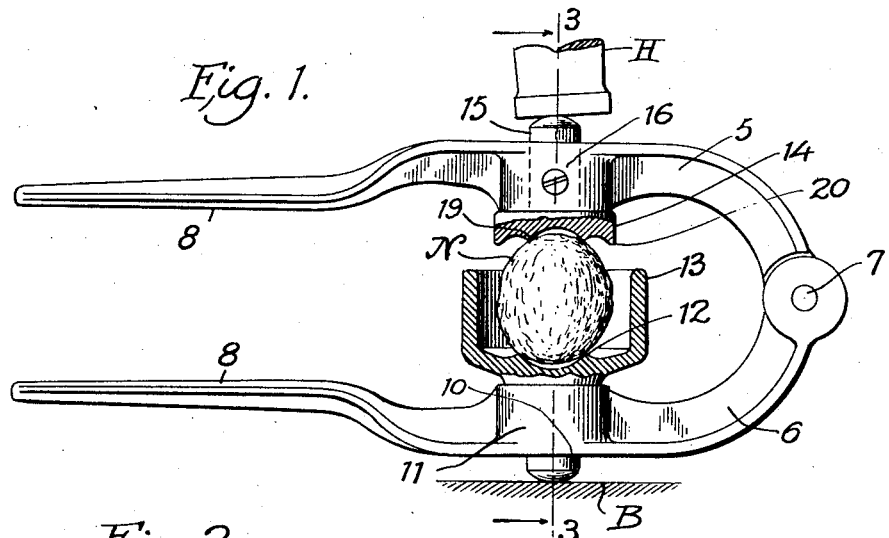

The invention is shown by way of illustration in the accompanying drawing, wherein:

Figure 1 is a side elevational view showing the anvil portions in section.

Figure 2:
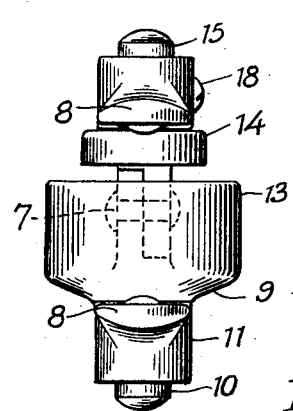

Figure 2 an end elevation thereof.

Figure 3:
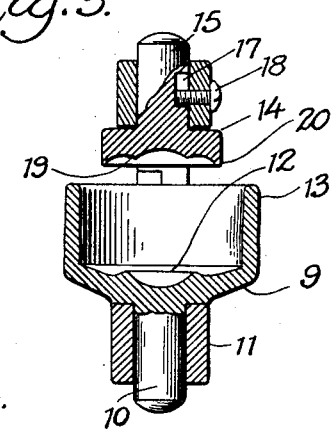
Figure 4:
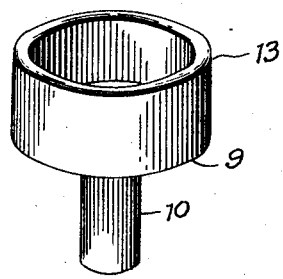

Figure 3 a transverse sectional view taken on the line 3—3 of Figure 1, and;

Figure 4 is a detailed perspective view of the protecting shield and receptacle on the lower anvil.

Referring to the construction in further detail and wherein like reference characters designate corresponding parts in the different views, the "nut cracker" comprises a pair of jaws 5 and 6 of simple design, hingedly connected as at 7 and having a pair of hands or grips 8. The aforesaid parts are made of suitable metal and of a size convenient for handling to the end that the nuts N may be readily and easily cracked between the anvil members mounted thereon as shown.

The lower anvil comprises a base or body member 9 having a shank portion 10 that is removably fitted within an aperture formed in the enlarged portion 11 of the lower jaw 6; and a bead or annular raised portion 12 is adapted to receive the nut as indicated in Figure 1.

A shield or receptacle portion 13 is formed integral with the base portion 9 and is of a size convenient to inclose the nut N to be cracked, as illustrated. The purpose of this shield is to guard against flying or scattering of shell fragments when the nuts are being cracked. It serves also to withhold or retain all of the nut portions after the breaking thereof.

The upper anvil comprises a body portion 14 having a shank member 15 mounted to have limited movement within the enlarged part 16 of the upper jaw 5. A slot 17 formed in the shank 15 receives a screw 18 for limiting the movement of the anvil as indicated in Figure 3.

The active face of the anvil 14 is provided with circumferential beads 19 and 20 disposed in different planes to the end that the inner bead 19 will break down the central part of the nut and immediately thereafter the groove between the beads, and the bead 20 will engage the larger nut shell portions and break them centrally and thus the kernel or meat portions of the nut may be recovered without further cracking.

In operation the projecting end of the anvil shank 10 is placed on a suitable solid foundation B, e. g. stone, iron, or the like, and with the nut in place the shank 15 of the top anvil is struck a blow with a hammer H. Said top anvil being free to move in its mounting will act to effectively break the nut shell as stated, and due to this freedom of movement of the anvil 14 the hand of the person holding the device by the gripping pieces 8 will be relieved from all jarring incident to the blow.

It is to be understood that the details of construction and arrangement of parts may be varied widely without departing from the spirit of the invention, and do not wish to limit myself to such features except as may be required by the claims.

What is claimed as new is:

1. A nut cracker comprising a fixed anvil provided with an annular beaded portion, a shield and receptacle associated therewith, and an overlying and slidable anvil having concentric beaded portions disposed in relatively different planes, said second anvil being exterior to but adapted to fit within said receptacle and shield for the purpose set forth.

2. A nut cracker comprising pivotally connected arms, an anvil mounted on one of said arms, said anvil having an upstanding and surrounding portion of appreciable height open at the top and providing a receptacle and shield, and a second anvil mounted on the other arm adapted to freely fit within said receptacle and shield in the process of cracking the nut and thereby provide a closure element for said receptacle, said anvils having portions projecting through said arms adapted to engage a support and striking hammer respectively, substantially as set forth.

In witness whereof, I have hereunto set my hand and seal at Philadelphia, Pennsylvania, this 14th day of November, A. D. nineteen hundred and twenty-eight.

JACOB S. BUCKWALTER. [L. S.]